(12) United States Patent
Peron et al.

(10) Patent No.: US 7,072,197 B2
(45) Date of Patent: Jul. 4, 2006

(54) ISOLATED LOW-VOLTAGE POWER SUPPLY SOURCE

(75) Inventors: Benoît Peron, Tours (FR); Frédéric Gautier, Tours (FR)

(73) Assignee: STMicroelectronics S.A., Montrouge (FR)

( * ) Notice: Subject to any disclaimer, the term of this patent is extended or adjusted under 35 U.S.C. 154(b) by 220 days.

(21) Appl. No.: 10/747,969

(22) Filed: Dec. 29, 2003

(65) Prior Publication Data

US 2004/0141344 A1   Jul. 22, 2004

(30) Foreign Application Priority Data

Dec. 27, 2002   (FR) .................................. 02 16806

(51) Int. Cl.
*H02M 7/00*   (2006.01)

(52) U.S. Cl. .................. 363/125; 363/126; 363/81
(58) Field of Classification Search .............. 363/78, 363/81, 87, 125, 126, 127, 44; 315/307, 315/308

See application file for complete search history.

(56) References Cited

U.S. PATENT DOCUMENTS

| 5,883,502 | A | * | 3/1999 | Spitaler | ..................... 363/126 |
| 6,018,472 | A | * | 1/2000 | Vogman | ..................... 363/126 |
| 6,366,030 | B1 | * | 4/2002 | Ito et al. | ..................... 315/307 |

FOREIGN PATENT DOCUMENTS

FR     2 783 981 A    3/2000

OTHER PUBLICATIONS

French Search Report for FR 0216806 dated Sep. 15, 2003.

* cited by examiner

*Primary Examiner*—Jessica Han
(74) *Attorney, Agent, or Firm*—Lisa K. Jorgenson; Bryan A. Santarelli; Graybeal Jackson Haley LLP

(57) ABSTRACT

An isolated circuit of low-voltage supply of a control circuit of a high-voltage load, in or upstream of a fullwave three-phase rectifying bridge, comprising a first low-voltage capacitor having a first electrode connected to one of the rectified output terminals of the bridge, and at least one second capacitor providing said low voltage, a first electrode of the second capacitor being connected to one of the A.C. input terminals of the bridge, the respective second electrodes of the capacitors being connected by a high-voltage diode having its cathode connected to the second capacitor.

21 Claims, 2 Drawing Sheets

ISOLATED LOW-VOLTAGE POWER SUPPLY SOURCE

PRIORITY CLAIM

This application claims priority from French patent application No. 02/16806, filed Dec. 27, 2002, which is incorporated herein by reference.

BACKGROUND OF THE INVENTION

1. Field of the Invention

The present invention relates to a power supply source of a relatively low D.C. voltage to a circuit for controlling a switch or a load supplied by a relatively high voltage. The present invention more specifically relates to the supply of a high-voltage load control circuit upstream of a rectifying bridge, for example, providing a rectified voltage to a power converter of switched-mode power supply type.

2. Discussion of the Related Art

FIG. 1 very schematically shows in the form of blocks a first conventional example of provision of a relatively low supply voltage to a control circuit 1, in this example, via a switch K, of a load 2 (Q) supplied by a relatively high A.C. voltage Vac applied between terminals P and N. Terminals P and N correspond to A.C. input terminals of a fullwave rectifying bridge 3 having rectified output terminals E and M supplying a power converter 4 (CONV), for example, of switched-mode power supply type. In the example of FIG. 1, converter 4 provides several D.C. voltages of different levels (for example, two voltages Vs1 and Vs2) referenced to a ground G that may be different from output ground M of bridge 3.

The supply voltage of control circuit 1 is, for example, provided by a supply block 6 itself supplied from a voltage Vsaux provided by converter 4 by means of an auxiliary winding.

A problem is that the winding of provision of voltage Vsaux must be referenced to neutral N of the A.C. power supply, which must thus be isolated from ground G of the other output voltages of converter 4. This need for isolation within the actual converter 4, linked to the presence of an auxiliary winding referenced to the A.C. network, increases the converter complexity and bulk.

Further, the auxiliary winding alters the coupling and increases leakage inductances of the converter.

FIG. 2 shows a second conventional example of provision of a supply voltage to a control circuit 1 of a load 2 supplied by an A.C. voltage Vac. It shows fullwave rectifying bridge 3 and a converter of switched-mode power supply type 4'. The essential difference with respect to FIG. 1 is that the example of FIG. 2 uses a high-voltage capacitor CX upstream of rectifying bridge 3 rather than an auxiliary winding of converter 4'. Capacitor CX is connected by one of its electrodes to phase P of the A.C power supply and by the other one of its electrodes to a resistor R in series with a diode D and a capacitor C providing the supply voltage of circuit 1. A zener diode DZ is connected between the junction point of resistor R and diode D, and neutral N of the A.C. power supply. Zener diode DZ sets the value of the voltage across capacitor C, and thus of the low supply voltage of circuit 1. Diode D is used as a rectifying element, capacitor C being recharged one halfwave out of two of A.C. voltage Vac, since diode DZ conducts forward via capacitor CX.

The example of FIG. 2, which actually consists of forming a high non-dissipative impedance in series with capacitor C of provision of the supply of control circuit 1, poses the same problems of size and cost as the example of FIG. 1.

SUMMARY OF THE INVENTION

An embodiment of the present invention aims at providing a novel solution to supply, with a relatively low voltage, a control circuit of a load supplied by a relatively high voltage, generally an A.C. voltage, which overcomes the disadvantages of known solutions.

In an application to a circuit comprising a power converter supplied by a rectifying bridge, the embodiment of the present invention more specifically aims at avoiding use of a specific auxiliary winding of the converter and at thus solving isolation problems, while drawing the supply power of control circuit 1, placed upstream of the rectifying bridge, downstream of said bridge.

An embodiment of the present invention also aims at avoiding use of a high impedance upstream of the rectifying bridge.

To achieve these and other objects, an embodiment of the present invention provides an isolated circuit of low-voltage supply of a control circuit of a high-voltage load, in or upstream of a rectifying bridge, comprising:

a first low-voltage capacitor having a first electrode connected to one of the rectified output terminals of the bridge; and at least one second capacitor providing said low voltage, a first electrode of the second capacitor being connected to one of the A.C. input terminals of the bridge, the respective second electrodes of the capacitors being connected by a high-voltage diode having its cathode connected to the second capacitor.

According to an embodiment of the present invention, the charge of the second capacitor occurs during a conduction period of the bridge when that of its rectifying elements which connects the respective first electrodes of the capacitors conducts, this element connecting the electrodes having the most negative potential.

According to an embodiment of the present invention, the first capacitor is a capacitor of low-voltage supply of a circuit downstream of the bridge.

According to an embodiment of the present invention, the circuit comprises a second high-voltage diode having its anode connected, via a logic control switch, to the second electrode of the first capacitor, and having its cathode connected to a logic input terminals of the control circuit upstream of the bridge.

According to an embodiment of the present invention, the rectifying bridge is a fullwave or three-phase bridge.

According to an embodiment of the present invention, the bridge is a composite or controlled bridge.

According to an embodiment of the present invention, said load is formed of at least one of the rectifying elements of the bridge.

According to an embodiment of the present invention, the first capacitor is charged by an auxiliary winding of a transformer of a switched-mode power supply downstream of the bridge.

The foregoing objects, features, and advantages will be discussed in detail in the following non-limiting description of specific embodiments in connection with the accompanying drawings.

DETAILED DESCRIPTION

Figure 1:
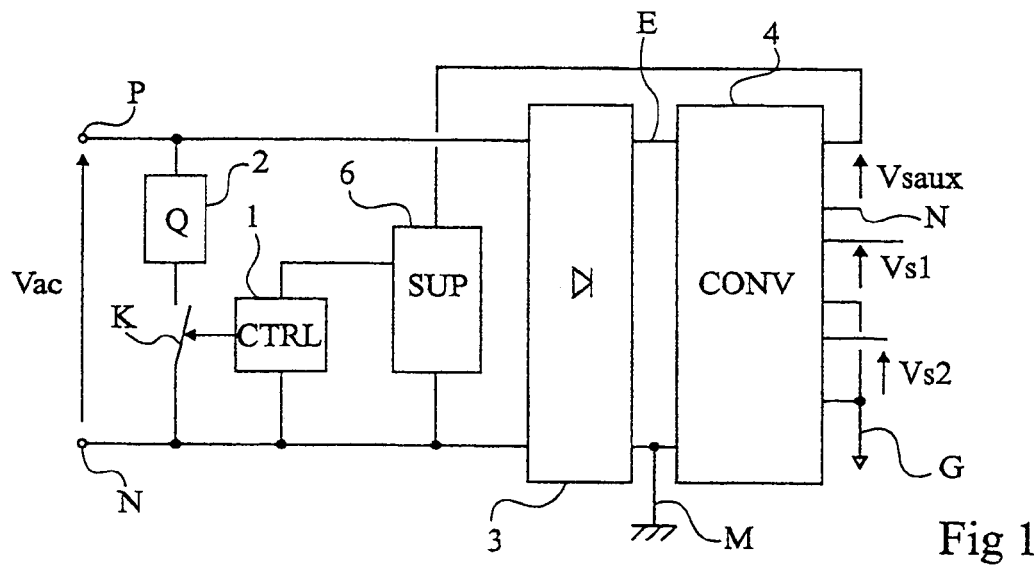
FIG. 1, previously described, schematically shows in the form of blocks a first conventional example of an isolated low-voltage supply circuit.

Same elements have been referred to with same reference numerals in the different drawings. For clarity, only those elements which are necessary to the understanding of the present invention have been shown in the drawings and will be described hereafter. In particular, the present invention will be described hereafter in relation with an example of application to a bridge for supplying a converter of switched-mode power supply type. It should however be noted that the present invention more generally applies whatever the elements connected downstream of the fullwave or three-phase rectifying bridge, provided that a low-voltage capacitor is available therein. Further, the structure of the power converter of switched-mode power supply type has not been detailed and is no object of the present invention.

An embodiment of the present invention uses a capacitor storing a relatively low voltage downstream of the fullwave or three-phase rectifying bridge to supply a capacitor, arranged upstream of the rectifying bridge and intended to provide the supply of the isolated low-voltage control circuit. According to this embodiment of the present invention, the two capacitors are connected by a high-voltage diode providing the isolation.

Another embodiment of the present invention uses one of the diodes (or more generally one of the rectifying elements) of the fullwave or three-phase bridge to close the charge circuit of the capacitor placed upstream of the bridge. On this regard, this embodiment of the present invention uses this rectifying element integrated to the bridge, in forward conduction, only when it conducts to ensure the power transfer to the power converter downstream of the bridge.

Figure 2:
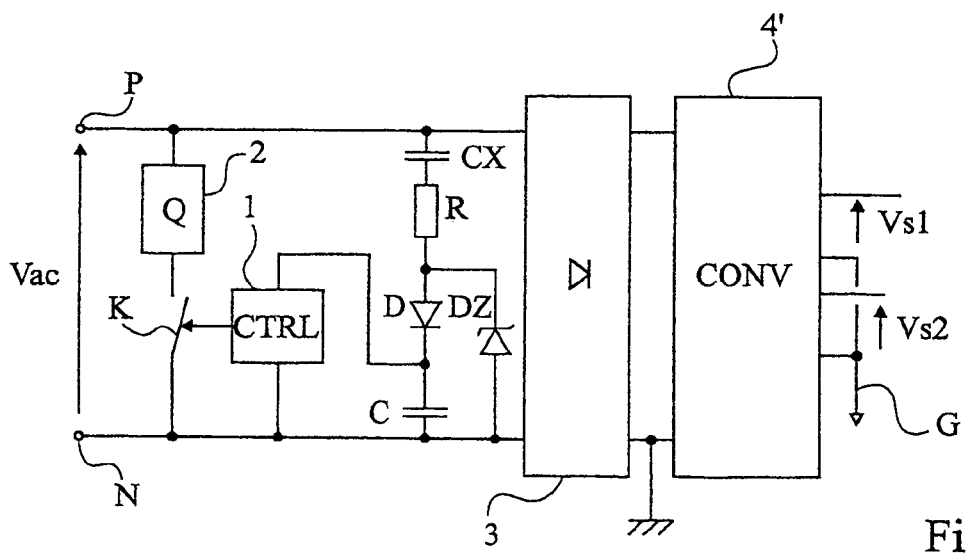
FIG. 2, previously described, schematically shows in the form of blocks a second conventional example of an isolated low-voltage supply circuit.
Figure 3:
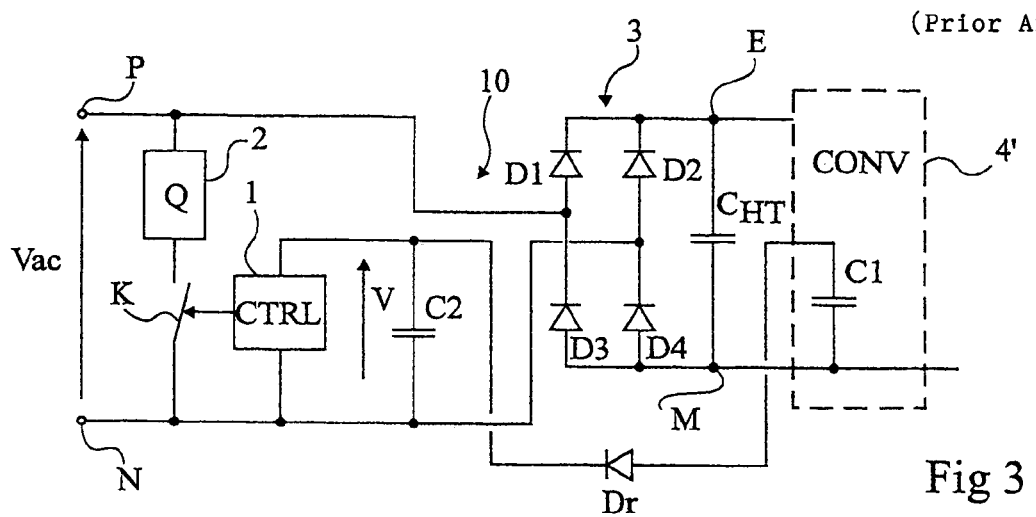
FIG. 3 schematically shows in the form of blocks an embodiment of an isolated low-voltage supply circuit according to an embodiment of the present invention.

FIG. 3 schematically shows in the form of blocks an embodiment of an isolated low-voltage supply circuit 10 according to the present invention. Circuit 10 is intended to provide a voltage V for supplying a control circuit 1 (CTRL) of a high-voltage load 2 (Q). In the example of FIG. 3, circuit 1 controls a switch K placed in series with load 2 between two terminals P and N of application of an A.C. voltage Vac. A fullwave rectifying bridge 3 has its A.C. inputs connected to terminals P and N and provides a rectified high voltage to a converter 4' CONV of switched-mode power supply type similarly to the conventional example of FIG. 2. In FIG. 3, a high-voltage capacitor CHT has been shown between rectified output terminals E and M of bridge 3. Capacitor CHT is intended to store the capacitor supply voltage. Bridge 3 is in this example formed of four diodes D1 to D4, diodes D1 and D3, as well as diodes D2 and D4 being in series between terminals E and M. The anodes of diodes D1 and D2 are respectively connected to terminals P and N.

According to this embodiment of the present invention, circuit 10 essentially comprises:

a capacitor C1 downstream of bridge 3, having one of its electrodes connected to one of the rectified output terminals of the bridge (here, terminal M), and thus to the common anodes of the rectifying elements;

at least one capacitor C2 for providing voltage V, placed upstream of bridge 3 and having one of its electrodes connected to one of the A.C. input terminals (here, terminal N) of bridge 3; and a diode Dr (or more generally a rectifying element) connecting the second respective electrodes of capacitors C1 and C2, the anode of diode Dr being connected to the capacitor electrode downstream of bridge 3.

According to this embodiment of the present invention, capacitors C1 and C2 are both low-voltage capacitors. Diode Dr plays the role of an isolation barrier on the second (positive) electrodes of the capacitors while a diode (here, D4) of bridge 3 plays the role of an isolation barrier between the first capacitor electrodes (the grounds).

This embodiment of the present invention takes advantage of the presence in bridge 3 of diode D4. However, said diode is not used like in its normal operation within the bridge. Indeed, for the charge of high-voltage capacitor CHT between terminals E and M, forward diodes D1 and D4 are used for arbitrarily positive halfwaves and diodes D2 and D3 are used for negative halfwaves also when forward biased.

According to this embodiment of the present invention, capacitor C2 providing relatively low voltage V only charges by direct transfer of the power of capacitor C1 by balancing the respective charges of capacitors C1 and C2. The only condition on bridge 3 is that this charge balance is performed during periods when diode D4 conducts, that is, in the example, during charge periods of capacitor CHT on positive halfwaves. However, according to this embodiment of the present invention, diode D4 is then not used to transfer the power in its forward direction.

Indeed, when diode D4 conducts, the voltage thereacross decreases and tends towards its junction voltage (for example, on the order of 0.6 volt). Then, if the voltage across capacitor C2 is smaller than the voltage across capacitor C1, diode Dr turns on and the voltages across capacitors C2 and C1 balance. Indeed, the voltage drops in diodes D4 and Dr compensate for each other so that voltage V across capacitor C2 corresponds to the voltage across capacitor C1. In fact, the direction of diodes Dr and D4 results in that capacitor C1 recharges capacitor C2. In fact, the current ensuring the charge of capacitor C2 subtracts from the current corresponding to the power transfer to converter 4' for its operation.

The only precaution to be taken to implement this embodiment of the present invention is for capacitor C1, if it must further supply elements of converter 4', to be given a sufficient size to provide the power both for these elements and for control circuit 1. In other words, capacitor C1 is sized according to the application to permanently provide a sufficient voltage.

Preferably, capacitor C1 downstream of bridge 3 corresponds to a capacitor used to supply a control circuit (not shown) of converter 4 (for example, the control circuit of the cut-off switch of this converter). In this case, this embodiment of the present invention takes advantage of the existence of a low-voltage capacitor downstream of the bridge to use the power stored by the latter to transfer this power onto capacitor C2 upstream of the bridge.

An advantage of this embodiment of the present invention is that it requires no additional auxiliary winding isolated from the other windings of converter 4'. The coupling of the transformer for providing low voltages by the converter is thus improved with respect to the case where one of the windings must be referenced to the neutral of the A.C. power supply. This embodiment of the present invention uses one of the existing windings (for example, that providing the supply voltage of the converter control circuit).

Another advantage of this embodiment of the present invention is that it requires no high-voltage capacitor, be it upstream or downstream of the rectifying bridge.

Another advantage of this embodiment of the present invention is that its implementation only requires, as compared to a conventional circuit of the type illustrated in FIG. 2, a slight oversizing of supply capacitor C1 of the cut-off switch circuit to take into account the supply voltage necessary for circuit 1 upstream of the rectifying bridge.

Of course, diode Dr is a high-voltage diode, to respect the need for isolation, diode D4 being as for itself necessarily a high-voltage diode since it is already integrated in the bridge.

Figure 4:
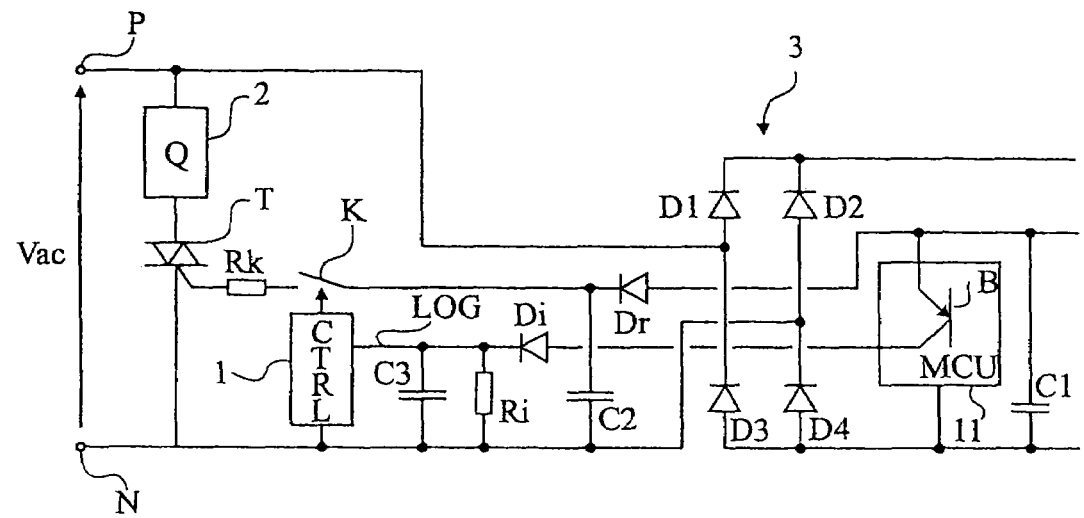
FIG. 4 shows an alternative embodiment of an isolated low-voltage supply circuit according to the present invention, adapted to providing a logic reference value to the supplied circuit.

FIG. 4 shows an alternative embodiment of the present invention. This alternative consists of adding to a supply circuit of the type described in relation with FIG. 3 a logic information transfer circuit between the circuit portion downstream of the rectifying bridge and control circuit 1 supplied by capacitor C2. In this example, it has been considered that control circuit 1 was intended to turn off a switch K supplying, through capacitor C2, the gate of a triac T in series with load 2 between terminals P and N. Optionally, a resistor Rk (possibly confounded with switch K) is interposed between the latter and the gate of triac T.

According to this alternative embodiment of the present invention, the control circuit receives a logic reference value LOG from a logic circuit 11 (MCU) downstream of rectifying bridge 3. For example, circuit 11 is a microcontroller having an output open-collector-assembled transistor B with its emitter connected to the positive electrode of capacitor C1 and its base controlled by circuit 11 (in a way not shown).

According to this alternative embodiment of the present invention, the collector of transistor B or any other equivalent element providing a logic level is connected, via an isolation diode Di, to the input of circuit 1 receiving signal LOG, which is further connected to ground (neutral N of the A.C. power supply) by a capacitor C3 in parallel with a resistor Ri. The function of capacitor C3 is to temporarily store the logic signal control state, resistor Ri being there to have this signal disappear after some time (time constant defined by components C3 and Ri).

Like for the supply of capacitor C2, the logic reference value is transmitted from downstream to upstream of the rectifying bridge only when diode D4 conducts and the isolation between the upstream and downstream portions of the rectifying bridge is guaranteed, for the control signal, by diodes D1 and D4.

An advantage of the embodiment of FIG. 4 is that it enables transferring a control reference value only by adding a high-voltage diode Di between the circuit portions downstream and upstream of a rectifying bridge supplying a converter.

Figure 5:
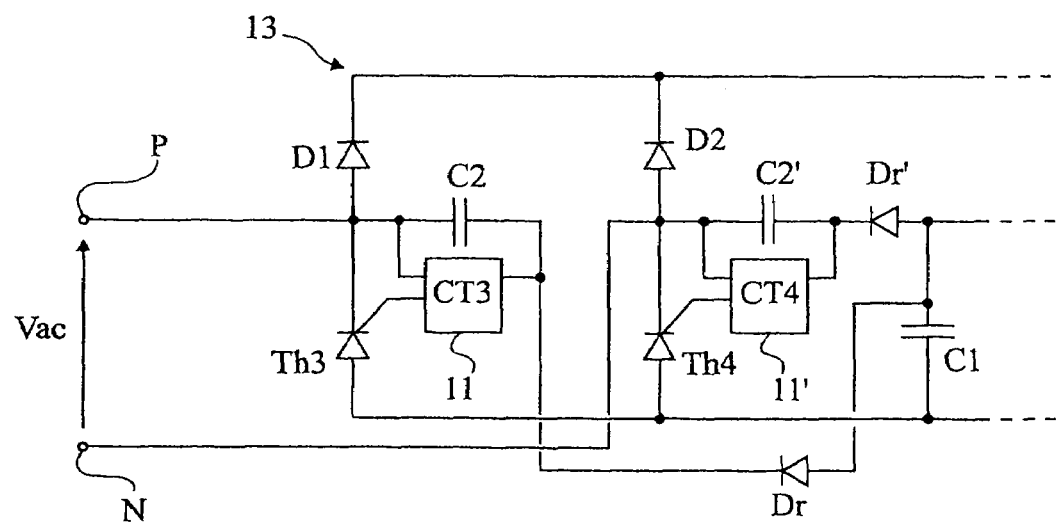
FIG. 5 shows another embodiment of an isolated supply circuit, dedicated to a controllable bridge.

FIG. 5 schematically and partially shows another embodiment of the present invention according to which the load to be controlled precisely is rectifying bridge 13. In this example, the bridge is a composite bridge in which, as compared to the previous drawings, diodes D3 and D4 have been replaced with two cathode-gate thyristors Th3 and Th4. Downstream of bridge 13, same elements as those described in relation with the previous drawings are present, that is, a converter not shown and a low-voltage capacitor C1.

According to this embodiment of the present invention, capacitor C1 is used to provide power to circuits 11 (CT3) and 11' (CT4) for controlling thyristors, respectively Th3 and Th4, via two capacitors C2 and C2' having an operation identical to that described in the preceding drawings for capacitor C2. Each capacitor C2, C2' is associated with a diode Dr, Dr' connected downstream of bridge 13 on the positive electrode of capacitor C1. Circuits 11 and 11' are supplied by the respective voltages across capacitors C2 and C2'.

Such an embodiment enables generating the power supply necessary to control the thyristors of the composite bridge.

It should be noted that what has been described hereabove in relation with the thyristors of the low portion of the bridge (neutral of the A.C. power supply) may also be performed if the thyristors are on the phase side of the power supply, more generally corresponding to a circuit with common cathodes. A structure with a diode and a capacitor is then reproduced, but from capacitor C2. Capacitor C2 then charges, through the additional diode, the additional capacitor having an electrode connected to terminal E. The power still comes from capacitor C1, but transiting through capacitor C2. The modifications to be made can be deduced from the functional discussion made in relation with the previous drawings.

Of course, the present invention is likely to have various alterations, modifications, and improvements which will readily occur to those skilled in the art. In particular, the dimensions given to the different capacitors and especially to the low-voltage capacitor(s) specific to the present invention depend on the application and on the expected consumptions of the control circuits. Further, although the present invention has been described in relation with the exploitation of a supply capacitor (C1) of the control circuit of the cut-off switch of a power converter, it more generally applies as soon as it is desired to have a low-voltage source downstream of the rectifying bridge and that a switch in the bridge or upstream thereof is desired to be controlled, with an isolation of different reference voltages. Finally, the structure could be inverted by connecting capacitor C1 on the common cathodes of the rectifying elements (diodes D1 and D2) and thus obtaining a negative power supply across capacitor C2. The adaptations of the circuit for such an operation are within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting.

What is claimed is:

1. An isolated low-voltage supply source for a control circuit of a high-voltage load, in or upstream of a rectifying bridge, comprising:
   a first low-voltage capacitor having a first electrode connected to one of the rectified output terminals of the bridge; and
   at least one second capacitor providing said low voltage, a first electrode of the second capacitor being connected to one of the A.C. input terminals of the bridge, the respective second electrodes of the capacitors being connected by a high-voltage diode having its cathode connected to the second capacitor.

2. The circuit of claim 1, wherein the charging of the second capacitor occurs during a conduction period of the bridge when a rectifying element of the bridge which connects the respective first electrodes of the capacitors conducts, the first electrode of the second caoacitor being connected to the one of the A.C. input terminals of the bridge having the most negative potential.

3. The circuit of claim 1, wherein the first capacitor is a capacitor of low-voltage supply of a circuit downstream of the bridge.

4. The circuit of claim 1, comprising a second high-voltage diode having its anode connected, via a logic control switch, to the second electrode of the first capacitor, and having its cathode connected to a logic input terminal of the control circuit upstream of the bridge.

5. The circuit of claim 1, wherein the rectifying bridge is a fullwave or three-phase bridge.

6. The circuit of claim 1, wherein the bridge is a composite or controlled bridge.

7. The circuit of claim 6, wherein said load is formed of at least one of the rectifying elements of the bridge.

8. The circuit of claim 1, wherein the first capacitor is charged by an auxiliary winding of a transformer of a switched-mode power supply downstream of the bridge.

9. A power supply, comprising:
first and second input nodes operable to receive an AC voltage;
first and second output nodes operable to provide a rectified voltage;
a circuit having a first node coupled to one of the input nodes and having a second node;
a first capacitor having a first node coupled to one of the output nodes and having a second node;
a second capacitor having a first node coupled to the second node of the circuit and having a second node coupled to one of the input nodes; and
a first diode having first and second nodes respectively coupled to the second node of the first capacitor and to the first node of the second capacitor.

10. The power supply of claim 9 wherein the circuit and the second capacitor are coupled to the same one of the input nodes.

11. The power supply of claim 9, further comprising a full-wave rectifier coupled to the input nodes and to the output nodes.

12. The power supply of claim 9, further comprising a DC-DC converter coupled to the output nodes and to the second node of the first capacitor.

13. A power supply, comprising:
first and second input nodes operable to receive an AC voltage;
first and second output nodes operable to provide a rectified voltage;
a circuit coupled to one of the input nodes;
a first capacitor having a first node coupled to one of the output nodes and having a second node;
a second capacitor having a first node operable to provide a signal to the circuit and having a second node coupled to one of the input nodes;
a first diode having first and second nodes respectively coupled to the second node of the first capacitor and to the first node of the second capacitor;
a full-wave rectifier coupled to the input nodes and to the output nodes and to the circuit; and
wherein the circuit is operable to control operation of the full-wave rectifier.

14. A power supply, comprising:
first and second input nodes operable to receive an AC voltage;
first and second output nodes operable to provide a rectified voltage;
a circuit coupled to one of the input nodes;
a first capacitor having a first node coupled to one of the output nodes and having a second node;
a second capacitor having a first node operable to provide a signal to the circuit and having a second node coupled to one of the input nodes;
a first diode having first and second nodes respectively coupled to the second node of the first capacitor and to the first node of the second capacitor;
a third capacitor having a first node coupled to the circuit and having a second node coupled to one of the input nodes; and
a second diode having a first node coupled to the first node of the third capacitor and having a second node coupled to the second node of the first capacitor.

15. A power supply, comprising:
first and second input nodes operable to receive an AC voltage;
first and second output nodes operable to provide a rectified voltage;
a circuit coupled to one of the input nodes;
a first capacitor having a first node coupled to one of the output nodes and having a second node;
a second capacitor having a first node operable to provide a signal to the circuit and having a second node coupled to one of the input nodes;
a first diode having first and second nodes respectively coupled to the second node of the first capacitor and to the first node of the second capacitor;
a load coupled to one of the first and second input nodes;
a switch coupled to the load; and
wherein the circuit is operable to control the switch.

16. A power supply, comprising:
first and second input nodes operable to receive an AC voltage;
first and second output nodes operable to provide a rectified voltage;
a circuit coupled to one of the input nodes;
a first capacitor having a first node coupled to one of the output nodes and having a second node;
a second capacitor having a first node operable to provide a signal to the circuit and having a second node coupled to one of the input nodes; and
a first diode having an anode and a cathode respectively coupled to the second node of the first capacitor and to the first node of the second capacitor.

17. A power supply, comprising:
first and second input nodes operable to receive an AC voltage;
first and second output nodes operable to provide a rectified voltage;
a circuit coupled to one of the input nodes;
a first capacitor having a first node coupled to one of the output nodes and having a second node;
a second capacitor having a first node operable to provide a signal to the circuit and having a second node coupled to one of the input nodes;
a first diode having first and second nodes respectively coupled to the second node of the first capacitor and to the first node of the second capacitor; and a rectifier coupled to the input nodes and to the output nodes and including a second diode coupled between the first node of the first capacitor and the second nodes of the second capacitors.

18. A power supply, comprising:

first and second input nodes operable to receive an AC voltage;

first and second output nodes operable to provide a rectified voltage;

a circuit coupled to one of the input nodes;

a first capacitor having a first node coupled to one of the output nodes and having a second node;

a second capacitor having a first node operable to provide a signal to the circuit and having a second node coupled to one of the input nodes; and a first diode having first and second nodes respectively coupled to the second node of the first capacitor and to the first node of the second capacitor; and a rectifier coupled to the input nodes and to the output nodes and including a second diode having a cathode coupled to the second node of the second capacitor and having an anode coupled to the first node of the first capacitor.

19. A method, comprising:

charging a second capacitor with a first capacitor when a first input node is positive relative to a second input node, the second capacitor having a first node coupled to a first node of the first capacitor and having a second node bidirectionally coupled to the second input node, the first capacitor having a second node coupled to an output node of a rectifier that is coupled to the first and second input nodes; and electrically isolating the first node of the first capacitor from the first node of the second capacitor when the first input node is negative relative to the second input node.

20. The method of claim 19, further comprising powering with the first capacitor a circuit coupled to one of the input nodes.

21. A method, comprising:

charging a second capacitor with a first capacitor when a first input node is positive relative to a second input node, the second capacitor having a first node coupled to a first node of the first capacitor and having a second node coupled to the second input node, the first capacitor having a second node coupled to an output node of a rectifier that is coupled to the first and second input nodes;

electrically isolating the first capacitor from the second capacitor when the first input node is negative relative to the second input node;

wherein charging the first capacitor comprises forward biasing a diode that coupled between the respective first nodes of the first and second capacitors; and wherein electrically isolating the first capacitor from the second capacitor comprises reverse biasing the diode.

* * * * *

UNITED STATES PATENT AND TRADEMARK OFFICE
CERTIFICATE OF CORRECTION

| | |
|---|---|
| PATENT NO. | : 7,072,197 B2 |
| APPLICATION NO. | : 10/747969 |
| DATED | : July 4, 2006 |
| INVENTOR(S) | : Peron Benoit and Frederic Gautier |

Page 1 of 1

It is certified that error appears in the above-identified patent and that said Letters Patent is hereby corrected as shown below:

Column 10 line 24 insert --is-- before "coupled"

Signed and Sealed this

Third Day of October, 2006

JON W. DUDAS
*Director of the United States Patent and Trademark Office*